（12) United States Patent
Bennett

(10) Patent No.: US 8,214,214 B2
(45) Date of Patent: Jul. 3, 2012

(54) EMOTION DETECTION DEVICE AND METHOD FOR USE IN DISTRIBUTED SYSTEMS

(75) Inventor: Ian M. Bennett, Palo Alto, CA (US)

(73) Assignee: Phoenix Solutions, Inc., Palo Alto, CA (US)

( * ) Notice: Subject to any disclaimer, the term of this patent is extended or adjusted under 35 U.S.C. 154(b) by 447 days.

(21) Appl. No.: 12/579,233

(22) Filed: Oct. 14, 2009

(65) Prior Publication Data

US 2010/0036660 A1 Feb. 11, 2010

Related U.S. Application Data

(63) Continuation-in-part of application No. 11/294,918, filed on Dec. 5, 2005, now abandoned.

(60) Provisional application No. 60/633,239, filed on Dec. 3, 2004.

(51) Int. Cl.
*G10L 15/04* (2006.01)
(52) U.S. Cl. ..................... 704/254; 704/270.1
(58) Field of Classification Search ........... 704/231–357
See application file for complete search history.

(56) References Cited

U.S. PATENT DOCUMENTS

| | | | |
|---|---|---|---|
| 6,487,534 B1 | 11/2002 | Thelen et al. | |
| 7,076,430 B1* | 7/2006 | Cosatto et al. | 704/275 |
| 7,983,910 B2* | 7/2011 | Subramanian et al. | 704/250 |
| 2002/0184373 A1* | 12/2002 | Maes | 709/228 |
| 2002/0194002 A1* | 12/2002 | Petrushin | 704/270 |
| 2010/0088088 A1 | 4/2010 | Bollano | |

FOREIGN PATENT DOCUMENTS

| | | |
|---|---|---|
| JP | 10214258 A1 | 8/1998 |
| JP | 11249867 A1 | 9/1999 |
| WO | WO9517764 A1 | 6/1995 |

* cited by examiner

*Primary Examiner* — Abul Azad

(57) ABSTRACT

A prosody analyzer enhances the interpretation of natural language utterances. The analyzer is distributed over a client/server architecture, so that the scope of emotion recognition processing tasks can be allocated on a dynamic basis based on processing resources, channel conditions, client loads etc. The partially processed prosodic data can be sent separately or combined with other speech data from the client device and streamed to a server for a real-time response. Training of the prosody analyzer with real world expected responses improves emotion modeling and the real-time identification of potential features such as emphasis, intent, attitude and semantic meaning in the speaker's utterances.

40 Claims, 8 Drawing Sheets

EMOTION DETECTION DEVICE AND METHOD FOR USE IN DISTRIBUTED SYSTEMS

CROSS-REFERENCE TO RELATED APPLICATIONS

The present application is a continuation in part of U.S. application Ser. No. 11/294,918, filed Dec. 5, 2005, which, in turn, claims priority to U.S. Provisional Application No. 60/633,239 filed Dec. 3, 2004. Both of those applications are hereby incorporated by reference in their entireties.

BACKGROUND OF THE INVENTION

1. Field of the Invention

The invention relates to a system and an interactive method for detecting and processing prosodic elements of speech based user inputs and queries presented over a distributed network such as the Internet or local intranet. The system has particular applicability to such applications as remote learning, e-commerce, technical e-support services, Internet searching, etc.

2. Description of Related Art

Emotion is an integral component of human speech and prosody is the principal way it is communicated. Prosody—the rhythmic and melodic qualities of speech that are used to convey emphasis, intent, attitude and semantic meaning, is a key component in the recovery of the speaker's communication and expression embedded in his or hers speech utterance. Detection of prosody and emotional content in speech is known in the art, and is discussed for example in the following representative references which are incorporated by reference herein: U.S. Pat. No. 6,173,260 to Slaney; U.S. Pat. No. 6,496,799 to Pickering; U.S. Pat. No. 6,873,953 to Lenning; U.S. Publication No. 2005/0060158 to Endo et al.; 2004/0148172 to Cohen et al; U.S. Publication No. 2002/0147581 to Shriberg et al.; and U.S. Publication No. 2005/0182625 to Azara et al. Training of emotion modelers is also known as set out for example in the following also incorporated by reference herein:

L. Breiman, J. H. Friedman, R. A. Olshen, and C. J. Stone. Classification and Regression Trees, Chapman & Hall, New York, 1984.

Schlosberg, H., A scale for the judgment of facial expressions, J of Experimental Psychology, 29, 1954, pages 497-510.

Plutchik, R., The Psychology and Biology of Emotion, Harper Collins, New York 1994.

Russell, J. A., How shall an Emotion be called, in R. Plutchik & H. Conte (editors), Circumplex Models of Personality and Emotion, Washington, APA, 1997.

Whissell, C., The Dictionary of Affect in Language, in R. Plutchik & H. Kellerman, Editors, Emotion: Theory, Research & Experience, Vol. 4, Academic Press, New York 1959.

'FEELTRACE': An Instrument for Recording Perceived Emotion in Real Time, Ellen Douglas-Cowie, Roddy Cowie, Marc Schröder: Proceedings of the ISCA Workshop on Speech and Emotion: A Conceptual Framework for Research Pages 19-24, Textflow, Belfast, 2000.

Silverman, K., Beckman, M., Ostendorf, M., Wightman, C., Price, P., Pierrehumbert, J. & Hirschberg, J. (1992), A standard for labelling english prosody, in 'Proceedings of the International Conference on Spoken Language Processing (ICSLP)', Vol. 2, Banff, pp. 867-870.

Shriberg, E., Taylor, P., Bates, R., Stolcke, A., Ries, K., Jurafsky, D., Coccaro, N., Martin, R., Meteer, M. & Ess-Dykema, C. (1998), 'Can prosody aid the automatic classification of dialog acts in conversational speech?', Language and Speech, 41(3-4), 439-487.

Grosz, B. & Hirshberg, J. (1992), Some intonational characteristics of discourse structure, in 'Proceedings of the International Conference on Spoken Language Processing', Banff, Canada, pp. 429-432.

Grosz, B. & Sidner, C. (1986), 'Attention, intentions, and the structure of discourse', Computational Linguistics 12, 175-204. P. Boersma, D. Weenink, PRAAT, Doing Phonetics by Computer, Institute of Phonetic Sciences, University of Amsterdam, Netherlands, 2004, http://www.praat.org Taylor, P., R. Caley, A. W. Black and S. King, Chapter 10, Classification and Regression Trees, Edinburgh Speech Tools Library, System Documentation, Edition 1.2, http://festvox.org/docs/speech_tools-1.2.0/c16616.htm Centre for Speech Technology, Univ. of Edinburgh, (2003)

Beckman, M. E. & G. Ayers Elam, (1997): Guidelines for ToBI labelling, version 3. The Ohio State University Research Foundation, http://www.ling.ohio-state.edu/research/phonetics/E_ToBI/

Conversely, real-time speech and natural language recognition systems are also known in the art, as depicted in Applicant's prior patents, including U.S. Pat. No. 6,615,172 which is also incorporated by reference herein. Because of the significant benefits offered by prosodic elements in identifying a meaning of speech utterances (as well as other human input), it would be clearly desirable to integrate such features within the aforementioned Bennett et al. speech recognition/natural language processing architectures. Nonetheless, to do this, a prosodic analyzer must also operate in real-time and be distributable across a client/server architecture. Furthermore, to improve performance, a prosodic analyzer should be trained/calibrated in advance.

SUMMARY OF THE INVENTION

An object of the present invention, therefore, is to provide an improved system and method for overcoming the limitations of the prior art noted above;

A primary object of the present invention is to provide a prosody and emotion recognition system that is flexibly and optimally distributed across a client/platform computing architecture, so that improved accuracy, speed and uniformity can be achieved for a wide group of users;

Another object of the present invention, therefore, is to provide an improved system and method for formulating SQL queries that includes parameters based on user emotional content;

A further object of the present invention is to provide a speech and natural language recognition system that efficiently integrates a distributed prosody interpretation system with a natural language processing system, so that speech utterances can be quickly and accurately recognized based on literal content and user emotional state information;

A related object of the present invention is to provide an efficient mechanism for training a prosody analyzer so that the latter can operate in real-time.

A first aspect of the invention concerns a system and method for incorporating prosodic features while performing real-time speech recognition distributed across a client device and a server device. The SR process typically transfers speech data from an utterance to be recognized using a packet stream of extracted acoustic feature data including at least some cepstral coefficients. In a preferred embodiment this aspect of the invention extracts prosodic features from the utterance to generate extracted prosodic data; transfers the extracted prosodic data with the extracted acoustic feature data to the server device; and recognizes an emotion state of a speaker of the utterance based on at least the extracted prosodic data. In this manner operations associated with recognition of prosodic features in the utterance are also distributed across the client device and server device.

In other embodiments the operations are distributed across the client device and server device on a case-by-case basis. A parts-of-speech analyzer is also preferably included for identifying a first set of emotion cues based on evaluating a syntax structure of the utterance. In addition a preferred embodiment includes a real-time classifier for identifying the emotion state based on the first set of emotion cues and a second set of emotion cues derived from the extracted prosodic data.

In a system employing this aspect of the invention, the various operations/features can be implemented by one or more software routines executing on a processor (such as a microprocessor or DSP) or by dedicated hardware logic (i.e., such as an FPGA, an ASIC, PLA, etc.). A calibration routine can be stored and used on the client side or server side depending on the particular hardware and system configuration, performance requirements, etc.

The extracted prosodic features can be varied according to the particular application, and can include data values which are related to one or more acoustic measures including one of PITCH, DURATION & ENERGY. Correspondingly, the emotion state to be detected can be varied and can include for example at least one of STRESS & NON-STRESS; or CERTAINTY, UNCERTAINTY and/or DOUBT.

A further aspect concerns a system and method for performing real-time emotion detection which performs the following steps: extracting selected acoustic features of a speech utterance; extracting syntactic cues relating to an emotion state of a speaker of the speech utterance; and classifying inputs from the prosody analyzer and the parts-of-speech analyzer and processing the same to output an emotion cue data value corresponding to the emotion state.

Another aspect concerns a system/method training a real-time emotion detector which performs the following steps: presenting a series of questions to a first group of persons concerning a first topic (wherein the questions are configured to elicit a plurality of distinct emotion states from the first group of persons); recording a set of responses from the first group of persons to the series of questions; annotating the set of responses to include a corresponding emotion state; and training an emotion modeler based on the set of responses and corresponding emotion state annotations. In this fashion, an emotion modeler is adapted to be used in an emotion detector distributed between a client device and a server device.

In certain preferred embodiments visual cues are also used to elicit the distinct emotion states. The annotations can be derived from Kappa statistics associated with a second group of reviewers. The emotion modeler can be transferred in electronic form to a client device or a server device, where it can be used to determine an emotion state of a speaker of an utterance.

Still a further aspect of the invention concerns a real-time emotion detector which includes: a prosody analyzer configured to extract selected acoustic features of a speech utterance; a parts-of-speech analyzer configured to extract syntactic cues relating to an emotion state of a speaker of the speech utterance; a classifier configured to receive inputs from the prosody analyzer and the parts-of-speech analyzer and process the same to output an emotion cue data value corresponding to the emotion state. In this manner an emotion state is determined by evaluating both individual words and an entire sentence of words uttered by the user.

In preferred embodiments the classifier is a trained Classification and Regression Tree classifier, which is trained with data obtained during an off-line training phase. The classifier uses a history file containing data values for emotion cues derived from a sample population of test subjects and using a set of sample utterances common to content associated with the real-time recognition system. In the end, the emotion cue data value is in the form of a data variable suitable for inclusion within a SQL construct or some other form of data files suitable for query format.

Systems employing the present invention can also use the emotion state to formulate a response by an interactive agent in a real-time natural language processing system. These interactive agents are found online, as well as in advanced interactive voice response systems which communicate over conventional phone lines with assistance from voice browsers, VXML formatted documents, etc. The interactive agent may be programmed to respond appropriately and control dialog content and/or a dialog sequence with a user of a speech recognition system in response to the emotion state. For example, callers who are confused or express doubt may be routed to another dialog module, or to a live operator.

In some preferred embodiments an emotion state can be used to control visual feedback presented to a user of the real-time speech recognition system. Alternatively, in an application where display space is limited or non-existent, an emotion state can be used to control non-verbal audio feedback; for example, selection from potential "earcons" or hold music may be made in response to a detected emotion state.

In other preferred embodiments an amount of prosodic data to be transferred to the server device is determined on a case by case basis in accordance with one or more of the following parameters: a) computational capabilities of the respective devices; b) communications capability of a network coupling the respective devices; c) loading of the server device; d) a performance requirement of a speech recognition task associated with a user query. Both prosodic data and acoustic feature data or other representative speech data may or may not be packaged within a common data stream as received at the server device, depending on the nature of the data, the content of the data streams, available bandwidth, prioritizations required, etc. Different payloads may be used for transporting prosodic data and acoustic feature data for speech recognition within their respective packets.

It will be understood from the Detailed Description that the inventions can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions. Furthermore, while the inventions are presented in the context of certain exemplary embodiments, it will be apparent to those skilled in the art that the present teachings could be used in any application where it would be desirable and useful to implement fast, accurate speech recognition, and/or to provide a human-like dialog capability to an intelligent system.

BRIEF DESCRIPTION OF THE DRAWINGS

FIG. 1 is a block diagram of a preferred embodiment of an emotion analyzer distributed across a client/server computing architecture, and can be used as an interactive learning system, an e-commerce system, an e-support system, and the like;

DETAILED DESCRIPTION OF THE INVENTION

Brief Overview of Natural Language Query Systems

Figure 3:
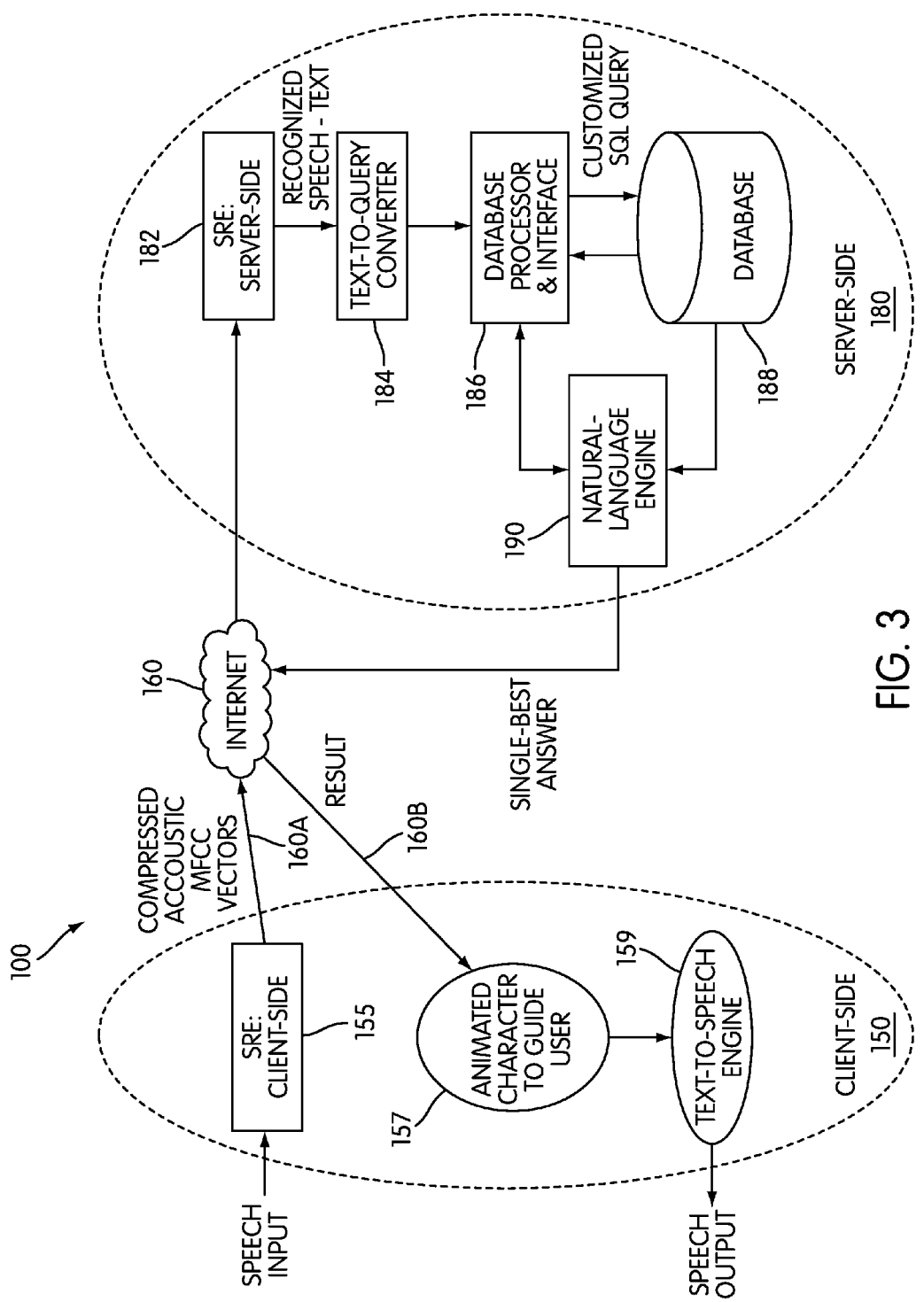
FIG. 3 is a block diagram of a prior art natural language query system (NLQS)

As alluded to above, the present inventions are intended to be integrated as part of a Natural Language Query System (NLQS), such as that shown in FIG. 3, which is configured to interact on a real-time basis to give a human-like dialog capability/experience for e-commerce, e-support, and e-learning applications. As seen in FIG. 3 the processing for NLQS 100 is generally distributed across a client side system 150, a data link 160, and a server-side system 180. These components are well known in the art, and in a preferred embodiment include a personal computer system 150, an INTERNET connection 160A, 160B, and a larger scale computing system 180. It will be understood by those skilled in the art that these are merely exemplary components, and that the present invention is by no means limited to any particular implementation or combination of such systems. For example, client-side system 150 could also be implemented as a computer peripheral, a PDA, as part of a cell-phone, as part of an INTERNET-adapted appliance, an INTERNET linked kiosk, etc. Similarly, while an INTERNET connection is depicted for data link 160A, it is apparent that any channel that is suitable for carrying data between client system 150 and server system 180 will suffice, including a wireless link, an RF link, an IR link, a LAN, and the like. Finally, it will be further appreciated that server system 180 may be a single, large-scale system, or a collection of smaller systems interlinked to support a number of potential network users.

Initially speech input is provided in the form of a question or query articulated by the speaker at the client's machine or personal accessory as a speech utterance. This speech utterance is captured and partially processed by NLQS client-side software 155 resident in the client's machine. To facilitate and enhance the human-like aspects of the interaction, the question is presented in the presence of an animated character 157 visible to the user who assists the user as a personal information retriever/agent. The agent can also interact with the user using both visible text output on a monitor/display (not shown) and/or in audible form using a text to speech engine 159. The output of the partial processing done by SRE 155 is a set of speech vectors that are transmitted over communication channel 160 that links the user's machine or personal accessory to a server or servers via the INTERNET or a wireless gateway that is linked to the INTERNET as explained above.

At server 180, the partially processed speech signal data is handled by a server-side SRE 182, which then outputs recognized speech text corresponding to the user's question. Based on this user question related text, a text-to-query converter 184 formulates a suitable query that is used as input to a database processor 186. Based on the query, database processor 186 then locates and retrieves an appropriate answer using a customized structured query language (SQL) query from database 188. A Natural Language Engine 190 facilitates structuring the query to database 188. After a matching answer to the user's question is found, the former is transmitted in text form across data link 160B, where it is converted into speech by text to speech engine 159, and thus expressed as oral feedback by animated character agent 157.

Although the above description refers to a "database," it should be understood that embodiments of the invention need not use a database per se. Instead, embodiments of the invention may use data files, databases, or any other form of data repository to store data, and the term "data repository" should be read broadly to include any type of data storage.

Because the speech processing is broken up in this fashion, it is possible to achieve real-time, interactive, human-like dialog consisting of a large, controllable set of questions/answers. The assistance of the animated agent 157 further enhances the experience, making it more natural and comfortable for even novice users. To make the speech recognition process more reliable, context-specific grammars and dictionaries are used, as well as natural language processing routines at NLE 190, to analyze user questions lexically. By optimizing the interaction and relationship of the SR engines 155 and 182, the NLP routines 190, and the dictionaries and grammars, an extremely fast and accurate match can be made, so that a unique and responsive answer can be provided to the user. For further details on the operation of FIG. 3, see U.S. Pat. No. 6,615,172.

Overview of System for Real Time Emotion Detection

The present invention features and incorporates cooperation between the following components: (1) a data acquisition component which utilizes speech utterances from test subjects; (2) a prosodic extraction component for extracting prosodic related acoustic features in real-time preferably from speech utterances; and (3) a comparator component which applies machine learning to the datasets—i.e. the dataset corresponding to the features extracted from the speech samples are fed to a decision tree-based machine learning algorithm. Decision trees implemented using algorithms learned from the dataset effectuate the decision tree used in the real-time emotion detector.

The key focus of this approach is to use the acoustic features extracted from representative speech samples as the mechanism for identifying the prosodic cues in real-time from a speech utterance and which can then be used to detect emotion states. Other components may be included herein without deviating from the scope of the present invention.

An emotion modeler comprising the above implements the extraction of the speaker's emotion state, and uses the benefits from the optimization of the machine learning algorithms derived from the training session.

Emotion Detector

The function of emotion detector 100 (FIG. 1) is to model the emotion state of the speaker. This model is derived preferably using the acoustic and syntactic properties of the speech utterance.

Emotion is an integral component of human speech and prosody is the principal way it is communicated. Prosody—the rhythmic and melodic qualities of speech that are used to convey emphasis, intent, attitude and semantic meaning, is a key component in the recovery of the speaker's communication and expression embedded in a speech utterance.

Figure 4:
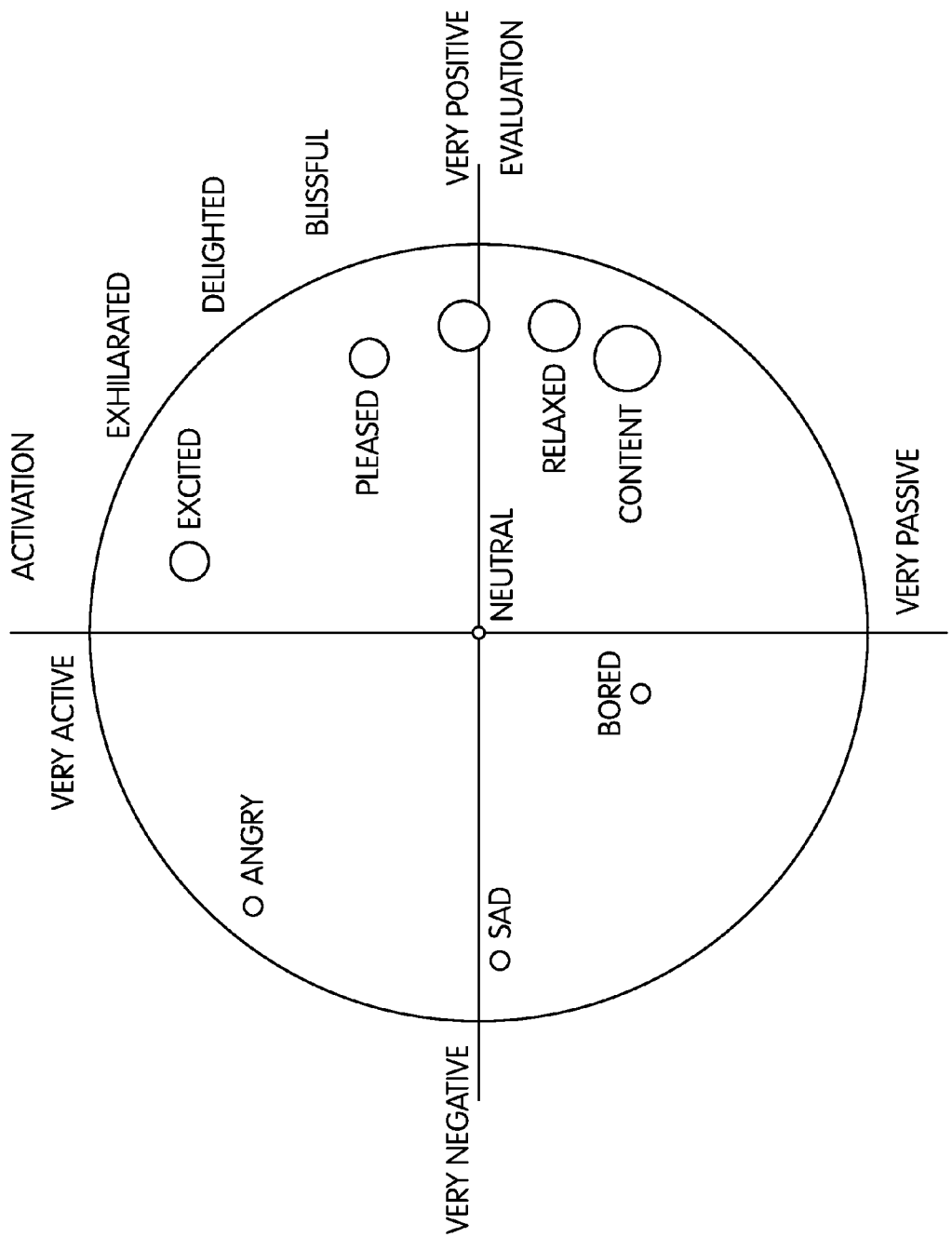
FIG. 4 is a diagram illustrating an activation-evaluation relationship implemented in preferred embodiments of the present invention.

A key concept in emotion theory is the representation of emotion as a two-dimensional activation—evaluation space. As seen in FIG. 4, the activation of the emotion state—the vertical axis, represents the activity of the emotion state, e.g. exhilaration represents a high level of activation, whereas boredom involves a small amount of activation. The evaluation of the emotion state—the horizontal axis, represents the feeling associated with the emotional state. For example, happiness is a very positive, whereas despair is very negative. Psychologists [see references 1, 2, 3, 4, 5 above] have long used this two dimensional circle to represent emotion states. The circumference of the circle defines the extreme limits of emotion intensity such as bliss, and the center of the circle is defined as the neutral point. Strong emotions such as those with high activation and very positive evaluation are represented on the periphery of the circle. An example of a strong emotion is exhilaration, an emotional state which is associated with very positive evaluation and high activation. Common emotions such as bored, angry etc. are placed within the circle at activation-evaluation coordinates calculated from values derived from tables published by Whissell referenced above.

Representative Prosodic Features

Pitch—the fundamental frequency, F0 of a speech utterance is the acoustic correlate of pitch. It is considered to be one of the most important attributes in expressing and detecting emotion. For this we extract F0 and compute the mean, maximum, minimum and variance and standard deviation of F0. In some applications, of course, it may not be necessary or desirable to compute all such variables, and in other instances it may be useful to use additional frequency components (or derivatives thereof).

Energy—the energy of the speech utterance is an acoustic correlate of the loudness of the speech utterance of the speaker. For example, high energy in a speech utterance is associated with high activation of the emotion state. Conversely, low energy levels of the speech utterance are associated with emotion states with low activation values.

Duration—the duration of the syllables that make up the speech utterance also is a acoustic correlate from which an emotion cue can be extracted. For example, the long duration of a syllable, may infer an emotional state corresponding to doubt—DOUBT compared to alternate emotional state of certainty—CERTAINTY which in turn may be represented by a shorter time duration of the same syllable.

In some applications, of course, it may not be necessary or desirable to compute all such variables, and in other instances it may be useful to use additional frequency, energy and/or duration components (or derivatives thereof). For example in many cases it may be useful to incorporate certain acoustic features (such as MFCCs, Delta MFCCs) changes in energy, and other well-known prosodic related data.

Data Acquisition

Figure 2:
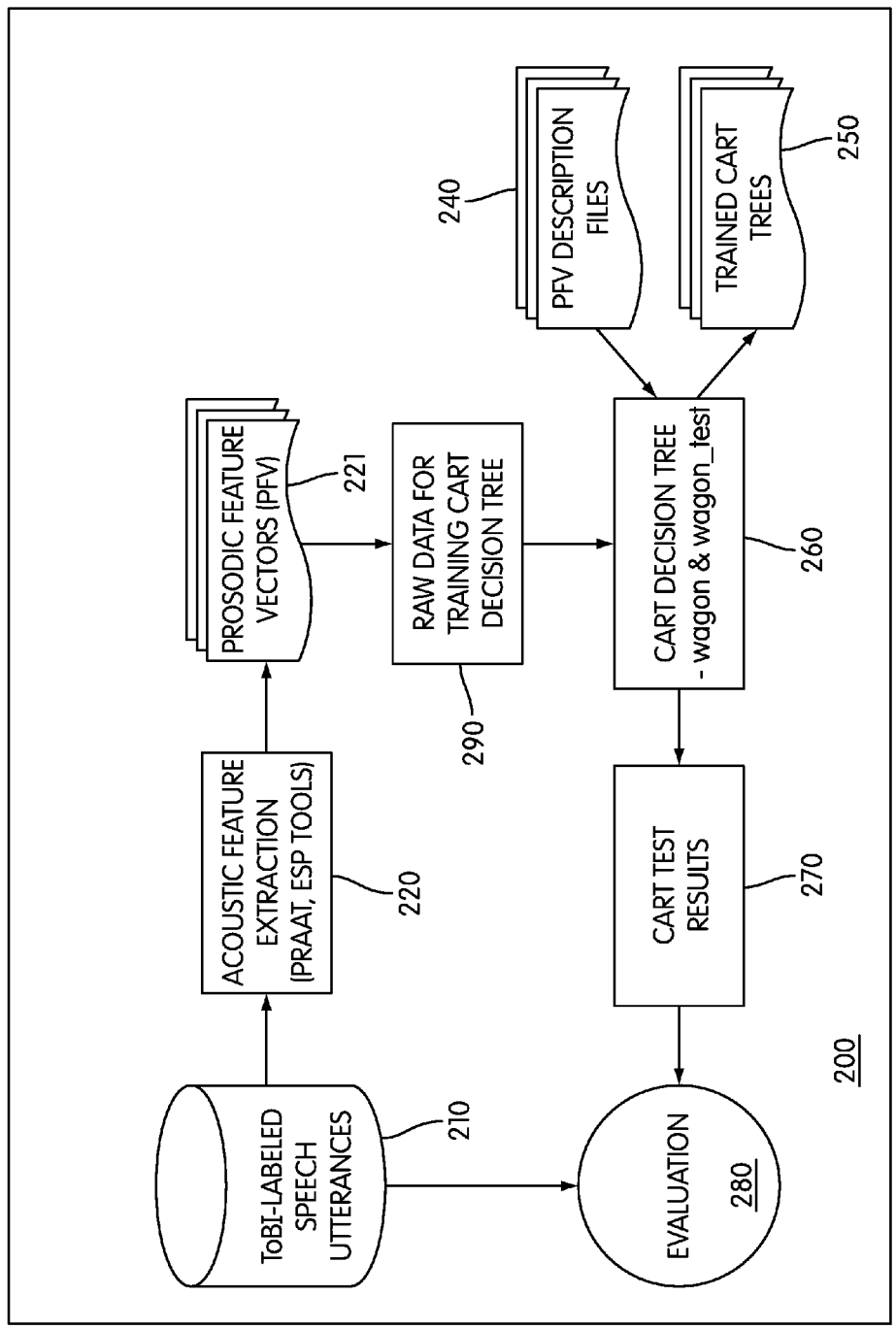
FIG. 2 illustrates one embodiment of an emotion modeler and classifier of the present invention.

An emotion modeler and classifier system 200 of the present invention is shown in FIG. 2. This system is trained with actual examples from test subjects to improve performance. This training data is generated based on Prosodic Feature Vectors calculated by a routine 230.

To implement a training session, a data experiment is devised as follows: preferably a group of persons (i.e. in one preferred embodiment, students of a representative age comparable to the user group of students expected to use a natural language query system) is presented with a series of questions for which answers are to be articulated by the person. These questions are designed so that the expected elicited answers aided by visual cues exhibit emotions of CERTAINTY, UNCERTAINTY and DOUBT. For example, questions that have obvious answers typically will have a response that is closely correlated to the emotion state of CERTAINTY and can be ascribed to be present in more than 90% of the answers, whereas questions which are difficult will elicit answers from which the person is not sure of and therefore contain the UNCERTAINTY emotion also in greater than 90% of the cases. The formulation of the questions can be performed using any of a variety of known techniques.

Speech samples from these representative test subjects are recorded in a controlled environment—i.e. in a localized environment with low background noise. The speech as articulated by speakers speaking in different styles but with emphasis on the styles that represent the intended emotion modes that each sample requires. The recordings are preferably saved as .wav files and analysis performed using a speech tool such as the Sony Sound Forge and open source speech tools such as PRAAT [11] speech analyzer and the Edinburgh Speech Tools [12]. Other similar tools for achieving a similar result are clearly useable within the present invention. The analysis is discussed in the next section.

The recorded speech data is then played back and each sample is manually annotated preferably using Tone and Break Indices (ToBI) [13] annotation as illustrated in 210 (FIG. 2) using the definitions and criteria for specific emotional states. ToBI is a widely used annotation system for speech intonational analysis, although other annotation systems may be more appropriate for different applications.

By using the ToBI annotation, one is able to derive the intonational events in speech from the human perception of speech intonation. Kappa statistics are then used to evaluate the consistency between the annotators. Kappa Coefficients are well known: $K=[P(A)-P(E)]/1-P(E)$ where $P(A)$, observed agreement, represents the proportion of times the transcribers agree, and $P(E)$, agreement expected by chance. Again any number of statistical approaches may be employed instead.

The emotion categories and criteria are as follows:

| Emotion | Description |
| --- | --- |
| CERTAINTY | No disfluencies; fluent answer; high energy |
| UNCERTAINTY | Disfluencies present; additional questions asked by the user re clarification - what is meant etc. |
| DOUBT | Slower response; heavily disfluent; lower energy |

The emotion states described in the table above can be extended to include other emotion states.

Feature Extraction

Acoustic features or other representative speech features are extracted by a routine shown as 220. Before the initiation of the feature extraction process, the speech samples are preferably re-sampled at a 44 kHz sampling rate to ensure higher fidelity speech sample and higher quality source data for the speech feature extraction tools. The PRAAT speech analysis tool and the Edinburgh Speech Tools (EST) are the preferred tools used to extract the training session speech features. Using scripts the PRAAT tool automatically extracts and archives of a large number of speech and spectrographic features from each speech sample. The EST library also contains a number of speech analysis tools from which other speech features such as linear predictive coefficients (LPC), cepstrum coefficients, mel-frequency cepstrum coefficients (MFCC), area, energy and power can be extracted. Most importantly the EST library includes Wagon, a CART decision tree tool 260 which is used to extract prosodic patterns from the speech data.

Decision Tree Classifier Training

Decision tree classifiers, such as shown in FIG. 2, are probabilistic classifiers that transform data inputted to it into a binary question based on the attributes of the data that is supplied. At each node of the decision tree, the decision tree will select the best attribute and question to be asked about the attribute for that particular node. The selection is based on the particular attribute and question about it so that it gives the best predictive value for the classification or bin. When the tree reaches the leaf nodes, the probability about the distribution of all instances in the branch is calculated, which is then used as predictors for the new raw data. The selection of the node splitting is based on an information theory-based concept called entropy—a measure of how much information some data contains. In the decision tree, entropy can be measured by looking at the purity of the resulting subsets of a split. For example, if a subset contains only one class it is purest; conversely, the largest impurity is defined as when all classes are equally mixed in the subset. See e.g., Breiman et al., 1984 referenced above).

The CART decision tree algorithm 260 extends the decision tree method to handle numerical values and is particularly less susceptible to noisy or missing data. CART (Classification and Regression Tree) introduced by Breiman, Freidman, Olshen, Stone referenced above is a widely used decision tree-based procedure for data mining. The CART technique uses a combination of statistical learning and expert knowledge to construct binary decision trees, which are formulated as a set of yes-no questions about the features in the raw data. The best predictions based on the training data are stored in the leaf nodes of the CART.

During the training phase of the CART decision tree 260, data is fed to the tree from a Prosodic Description File 240 and training data from Prosodic Feature Vectors 230 and the values of key parameters such as stop value and balance are optimized so that the output results of the tree have maximum correspondence with the results of the manual annotations.

The specific and preferred CART used in the present invention is the Wagon CART of the Edinburgh Speech Tools library. Wagon CART consists of two separate applications—wagon for building the trees, and wagon_test for testing the decision trees with new data. Wagon supports two variables used in the tree-building process: a stop values for fine-tuning the tree to the training data set; the lower the value (i.e. the number of vectors in a node before considering a split), the more fine tuned and the larger the risk of an over-trained tree. If a low stop value is used, the over trained tree can be pruned using the hold_out option, where a subset is removed from the training set and then used for pruning to build a smaller CART. The Wagon Cart requires a special structure of input—a prosodic feature vector (PFV)—i.e a vector that contains prosodic features in both predictor and predictees. Each row of this prosodic feature vector represents one predictee (a part of the PFV that has information about the class value, e.g. the accented class), and one or more predictors, each row having the same order of the predictors with the predictee as the first element in the row. The predictors are the values of the different prosodic cues that are selected. The size of the CART tree is optimized by means of the stopping criteria, which define the point when splitting of the nodes stops, i.e. when the purity of the node is highest. Another approach is to prune the tree—i.e. the tree is first grown out to a large size, then it is cut back or pruned to its best size. Other well-known approaches can also be used of course, and may vary from application to application. Referring to FIG. 2, the extracted acoustic features (as described in a following section Prosody Analysis, are extracted in 220. Then Prosodic Feature Vectors as described previously are formed in 221. The raw data, 290 for the Wagon CART is provided to the input of the Wagon CART. Then the output of the CART is sent to 250. The optimization of the CART tree output results is done in 280 by comparing the CART results 270 with the ToBI labeled speech utterances of 210. Once optimized, the trained CART trees are then outputted to 250 for later use.

Structure/Operation of Real-Time, Client Server Emotion Detector

Figure 1:
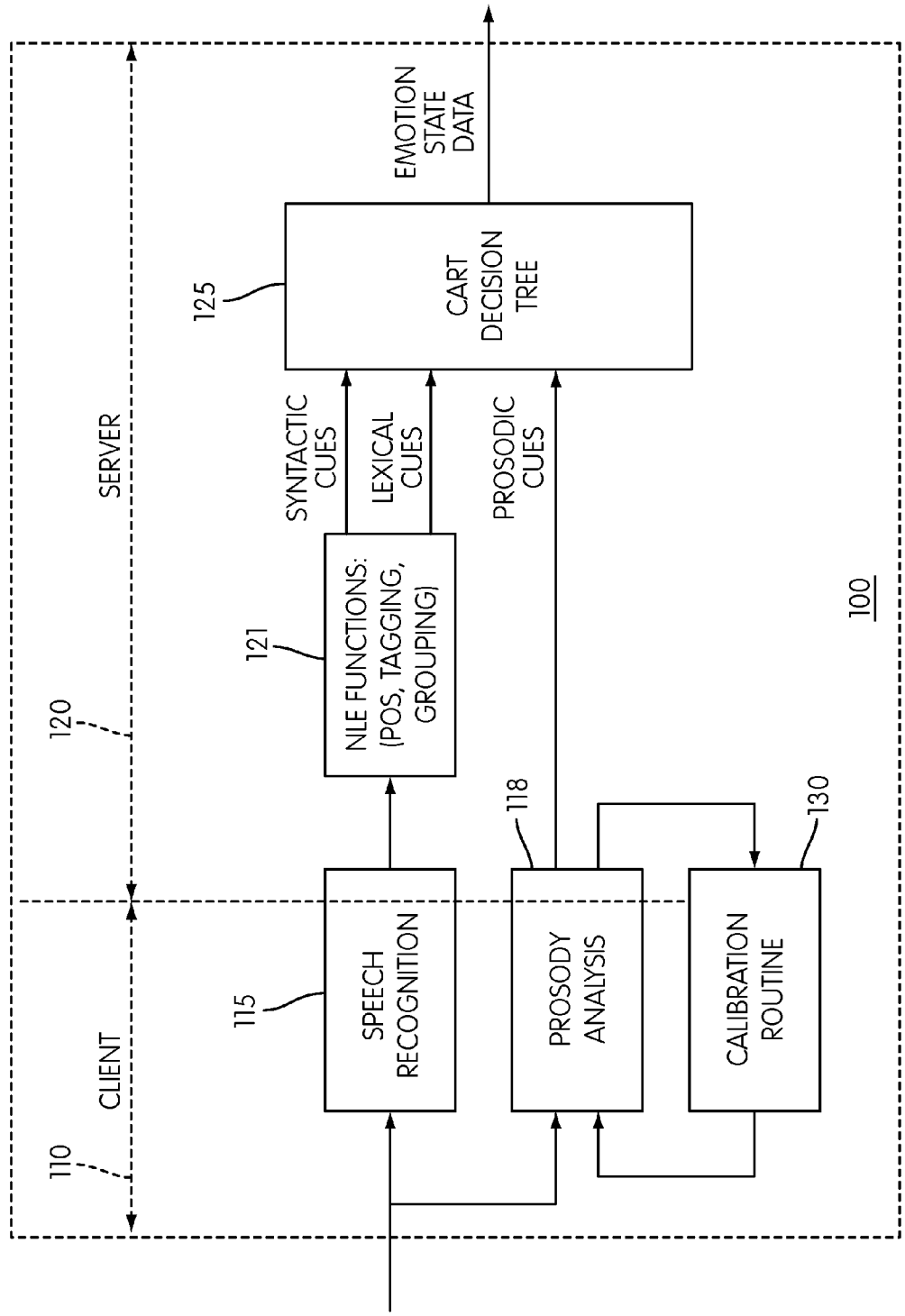

The emotion detector 100 is integrated with the NLQS system of the prior art (FIG. 3). Specifically as shown in FIG. 1, the emotion detector is preferably implemented in distributed configuration in which some functions reside at a client 110, and other functions are at a server side 120. As noted above, a speech recognition process is also distributed, so that a portion of speech operations is performed by hardware/software routines 115. Like the NLQS distributed speech recognition process, a significant portion of the emotion modeling and detection is implemented at the client side by a prosody analyzer 118. Speech data values that are extracted at the client side are transmitted to the server for incorporation in the SQL construct for the query process to a repository of data files, or incorporated in higher level logic of the dialog manager. In this way the turn-taking and control of the dialogue is significantly shaped by the emotion states extracted from the speaker's utterance.

Accordingly emotion detector 100 as shown works in parallel with the speech recognition processes. It consists of three main sections: (1) a prosody analyzer 118 which operates based on extracted acoustic features of the utterance; (2) a parts-of-speech analyzer 121 which yields syntactic cues relating to the emotion state; and (3) a trained classifier 125 that accepts inputs from the prosody analyzer 118 and the parts-of-speech analyzer and outputs data values which correspond to the emotion state embedded in the utterance.

The outputs of the prosody analyzer 118 and the parts-of-speech analyzer 121 are fed preferably to a trained CART classifier 125. This classifier 125 is trained with data obtained during the off-line training phase described previously. The data which populate the history file contained within the trained CART trees, 250 represent data values for the emotion cues derived from the sample population of test subjects and using the sample utterances common to the content in question. For example, in an educational application, the content would include tutoring materials; in other commercial applications the content will vary of course depending on the designs, objectives and nature of a vendor/operator's business, i.e. the business rules.

Prosody Analysis

The prosody analysis as noted above is preferably based on three key acoustic features—Fundamental Frequency (FO), Amplitude (RMS) and Duration (DUR), extracted in real-time from the utterance. These features and derivatives of the features as described in Table 1 are used as inputs by the trained classifier 125. Again this is not intended to be an exhaustive list, and other prosodic parameters could be used in many applications. As in the initialization of the speech recognition process at the client side, there is an analogous calibration procedure used to calibrate the speech and silence components of the speaker's utterance. The user initially articulates a sentence that is displayed visually, and the calibration process 130 estimates the noise and other parameters required to find the silence and speech elements of future utterances.

Specifically, the calibration routine 130 uses a test utterance from which a baseline is computed for one or more acoustic features that are extracted by the prosody analysis block 118. For example, the test utterance includes a set of phrases, one of which contains significant stress or accent or other emotion indicator from which a large shift in the fundamental frequency (F0), or pitch can be calculated. Other acoustic correlates such as amplitude and duration can also be calculated. This test utterance, as in the analogous case of the signal-to-noise ratio calibration of speech recognition routines, allows the system to automatically compute a calibration baseline for the emotion detector/modeler while taking into account other environmental variables.

TABLE 1

Acoustic Features and Descriptions.

| Acoustic Feature | Description |
| --- | --- |
| F0 | Fundamental frequency |
| F0 MAX | Maximum F0 |
| F0 MIN | Minimum F0 |
| F0 MEAN | Mean F0 |
| F0 RANGE | Difference between the highest F0 and lowest F0 |
| F0 STDV | Standard deviation in F0 |
| F0_ABOVE | Ratio of F0 100 ms from the median of $F_0$ compared to $F_0$ in the 100 ms range previous |
| RMS | Amplitude |
| RMS_MIN | Minimum amplitude |
| RMS_MAX | Maximum amplitude |
| RMS_RANGE | Difference between the highest and lowest amplitudes |
| RMS_STDV | Standard deviation from the amplitude mean |
| DUR | Duration - i.e. maximum time of word duration; The word duration is preferably normalized by the number of syllables contained in that word |
| DUR_MIN | Word duration minimum |
| DUR_MAX | Word duration maximum |
| DUR_MEAN | Word duration mean |
| DUR_STDV | Word duration standard deviation |
| ($F_0$ RANGE) × (DUR) | Combination of above |
| ($F_0$_RANGE) × (RMS) × (DUR) | Combination of above |

Parts of Speech (POS) Analysis

A NLQS system typically includes a parts-of-speech module 121 to extract parts-of-speech from the utterance. In the present invention this same speech module is also used in a prosodic analysis. Further processing results in tagging and grouping of the different parts-of-speech. In the present invention this same routine is extended to detect a syntactic structure at the beginning and the end of the utterance so as to identify the completeness and incompleteness of the utterance and/or any other out-of-grammar words that indicate emotion state such as DOUBT. For instance the sentences:

"This shape has a larger number of."

"This shape has a larger number of sides than the slot."

The previous sentence ending in 'of', is incomplete indicating DOUBT, whereas the second sentence is complete and indicates CERTAINTY. Other examples will be apparent from the present teachings. Thus this additional POS analysis can be used to supplement a prosodic analysis. Those skilled in the art will appreciate that other POS features may be exploited to further determine syntax structures correlative with emotion states. In this fashion an emotion state can be preferably determined by evaluating both individual words (from a prosodic/POS analysis) and an entire sentence of words uttered by the user (POS analysis).

Real-Time Classifier

The parts-of-speech analysis from routine(s) 121 yields syntactic elements from which emotion cues can be derived. The acoustic analyzer routine(s) 118 in turn yields separate data values for the prosodic acoustic correlates which are also related to emotion cues. These two categories of data are then inputted to a decision tree 125 where the patterns are extracted to estimate for the emotion state embedded in the of the speaker's utterance.

Again, the real-time classifier is preferably based on the Classification and Regression Tree (CART) procedure, a widely used decision tree-based approach for extracting and mining patterns from raw data. This procedure introduced by Breiman, Freidman, Olshen, Stone in 1984, is basically a flow chart or diagram that represents a classification system or model. The tree is structured as a sequence of simple questions, and the answers to these questions trace a path down the tree. The end point reached determines the classification or prediction made by the model.

In the end the emotion cue data value output from CART decision tree 125 can be in the form of a data variable suitable for inclusion within a SQL construct, such as illustrated in the aforementioned U.S. Pat. No. 6,165,172. The detected emotion state can also be used by an interactive agent to formulate a response, control dialog content and/or a dialog sequence, control visual feedback presented to a user, control non-verbal audio feedback such as selecting one or more audio recordings, etc., and as such are correlated/associated with different user emotion states.

In a distributed environment, the prosodic data is also preferably sent in a packet stream, which may or may not also include compressed or uncompressed speech data values, or extracted acoustic feature data for a speech recognition process, i.e., such as cepstral coefficients. Typically the prosodic data and other speech data values such as acoustic feature data are packaged within a common data stream to be sent to the server, however it may be desirable to separate the two into different sessions depending on channel conditions and capabilities of a server. For example the latter may not include a prosody capability, and therefore emotion detection may need to be processed by a separate server device.

Moreover in some instances the prosodic data and acoustic feature data can be transmitted using different priorities. For example, if for a particular application prosodic data is more critical, then computations for prosodic data can be accelerated and a higher priority given to packets of such data in a distributed environment. In some instances because of the nature of the data communicated, it may be desirable to format a prosodic data packet with a different payload than a corresponding speech recognition data packet (i.e., such as an MFCC packet sent via an RTP protocol for example). Other examples will be apparent to those skilled in the art.

Furthermore the emotion detection/prosodic analysis operations can be distributed across the client device and server device on a case-by-case, connection-by-connection, or device-by-device basis to achieve a real-time performance, and configured during an initialization procedure (i.e., such as within an MRCP type protocol). An amount of prosodic data to be transferred to said server device can be determined on a case-by-case basis in accordance with one or more of the following parameters: a) computational capabilities of the respective devices; b) communications capability of a network coupling the respective devices; c) loading of said server device; d) a performance requirement of a speech recognition task associated with a user.

Example

A Spoken Language Training System

Distributed speech recognition systems that are capable of recognizing and understanding the prosodic features of speech may be particularly useful in spoken language training systems. Spoken language training systems that are capable of recognizing, understanding, and responding to prosodic features may be able to use prosodic cues in the student's unconstrained speech to draw inferences about the student's level of understanding, and to structure the dialogue accordingly. Such systems may, for example, pick up on prosodic cues of misunderstanding or confusion while a dialogue is in progress and respond to them appropriately. Ultimately, these features may offer the student a satisfying, effective, and enjoyable tutoring session comparable to that offered by one-on-one human tutors.

Although the following description focuses on the implementation of a spoken language training system, it should be understood that the features, embodiments, and advantages described here are equally applicable to natural language voice-response customer service systems, and, more generally, to natural language voice-response systems employing automated agents to interact with users.

Figure 5:
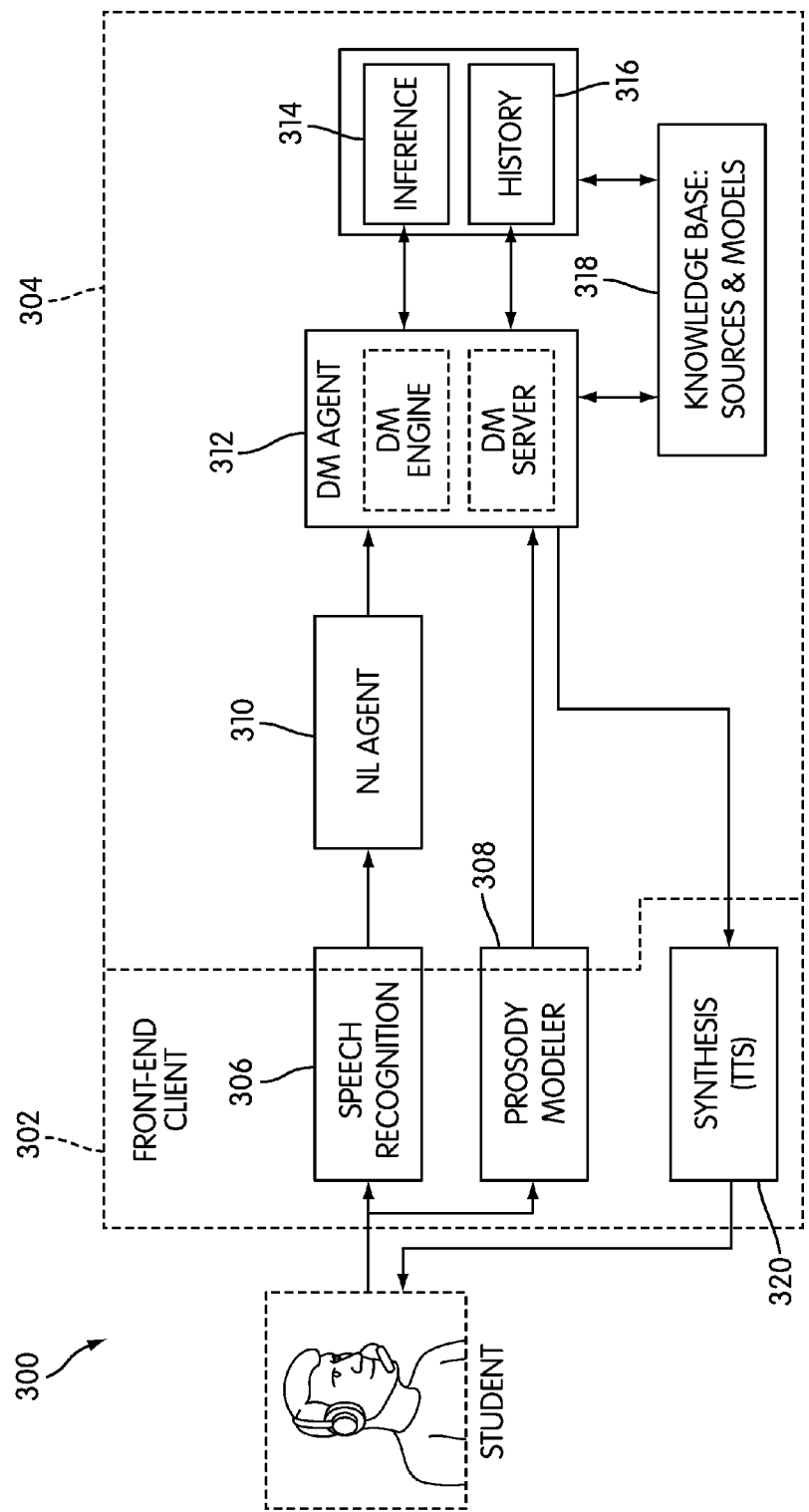
FIG. 5 is an illustration of a spoken language training system using an emotion modeler and classifier according to another embodiment of the invention.

FIG. 5 is a schematic diagram of a spoken language training system, generally indicated at 300, according to another embodiment of the invention. In the spoken language training system 100, tasks, and in particular, speech processing tasks, may be divided between a client device and a server essentially as described above with respect to FIG. 1, depending on an evaluation of the resources available at the client and the server. However, in some embodiments, instead of performing speech recognition tasks on the client side and transmitting speech related data (e.g., MFCC data) to the server, it may be more advantageous if the client merely sends direct speech or audio data to the server without performing any recognition tasks, for example, by compressing received speech utterances and transmitting substantially the entirety of the audio in compressed form to the server for recognition and further processing.

In FIG. 5, the system 300 is shown to include a front end or client 302 and a back end or server 304, although in some embodiments, the front end 302 and back end 304 may be implemented on the same system, rather than as a separate client device and a separate server. The front end 302 includes components similar to those shown and described with respect to FIG. 1: incoming speech utterances are received by a speech recognition agent or engine 306 as well as a prosody modeler and analyzer 308. The speech recognition engine 306, which may be a conventional engine such as the SRI Eduspeak speech recognition engine (SRI International, Menlo Park, Calif.), sends its output of recognized or substantially recognized speech to a natural language agent or engine 310. The natural language agent 310 provides its output of a natural language representation of the recognized speech to a dialogue manager (DM) 312.

Figure 6:
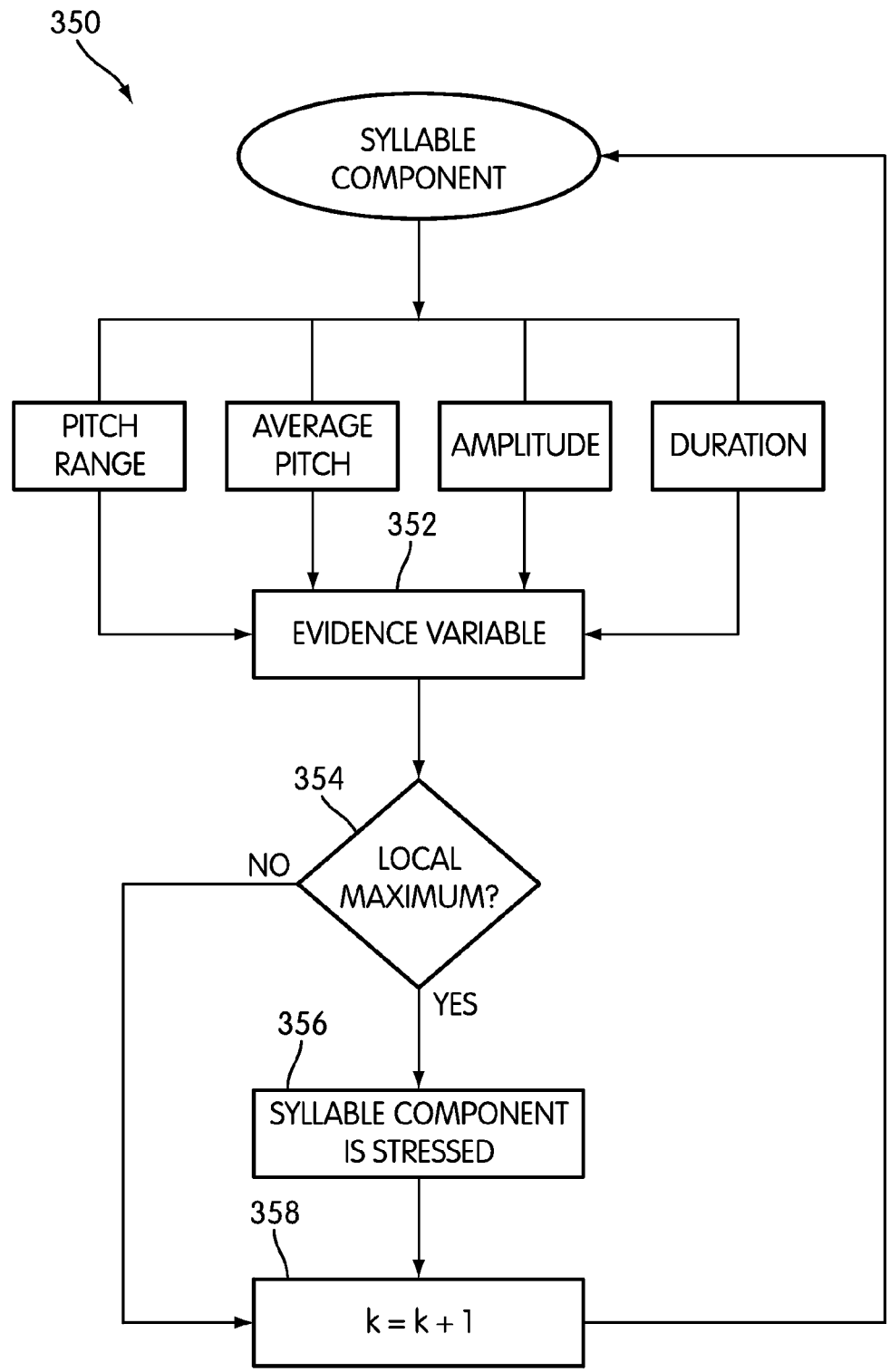
FIG. 6 illustrates an embodiment of an algorithm for a real-time prosody modeler.

The prosodic cues provided by the prosodic modeler 308 are also provided to the dialogue manager 312. The prosodic modeler 308 operates generally according to the method 350 illustrated in flow diagram of FIG. 6. More specifically, characteristics such as amplitude, pitch, pitch range and/or others derived from the base set are used to classify syllables into STRESS or NON-STRESS categories. As shown in FIG. 6, the result is an evidence variable 352 that represents the combination of the above correlates that leads to a local maximum for stress level classification accuracy. Receiver operator characteristic curves may be plotted using the key acoustic parameters to ascertain which acoustic parameter or combination of parameters play the dominant role in recognizing the stress level. As shown at 354 in method 300, if the evidence variable 352 represents a local maximum for stress level classification accuracy, then it is determined that the syllable component is stressed; if not, then the syllable component k is incremented at 358 and method 300 continues with the next syllable component.

As those of skill in the art will realize, the functions described above with respect to FIG. 1 may be implemented in a variety of ways. In one advantageous embodiment, the system 300 may be implemented using existing tools for building natural language environments, such as the Core component for Assessing the Meaning of Exploratory Language (CARMEL) framework, a language understanding framework for intelligent applications developed by the CIRCLE group, a joint center between the University of Pittsburgh and Carnegie Mellon University funded by the National Science Foundation. The CARMEL framework may facilitate the rapid development of deep sentence-level language understanding interfaces used by the system 300 without requiring a developer address complex computational linguistic aspects, but is flexible enough to allow the developer to access those aspects.

In a particularly advantageous embodiment, the system 300 may be constructed as a number of modular components functioning as software agents and adhering to the SRI Open Agent Architecture (OAA) framework. The SRI Open Agent Architecture (OAA) is a framework for integrating the various components that comprise a spoken dialogue system. Specifically, OAA is a piece of middleware that supports C++, Java, Lisp and Prolog and enables one to rapidly prototype components into a system. OAA allows rapid and flexible integration of software agents in a prototyping development environment. Because these components can be coded in different languages, and run on different platforms, the OAA framework is an ideal environment for rapid software prototyping and facilitates ease in adding or removing software components. The term agent refers to a software process that meets the conventions of the OAA framework, where communication between each agent using the Interagent Communication Language (ICL) is via a solvable, a specific query that can be solved by special agents. Each application agent as shown can be interfaced to an existing legacy application such as a speech recognition engine or a library via a wrapper that calls a pre-existing application programming interface (API).

As one example, cognitive reasoning models implemented within cognitive reasoning agents may be used to create models of tutors that can be embedded in the interactive learning environment. These cognitive reasoning agents monitor and assess the student's performance, coach and guide the student as needed, and keep a record of what knowledge or skills the student has demonstrated and areas where there is need for improvement. Cognitive reasoning agents may also create a profile or characterization of the student before and after the lesson.

Figure 7:
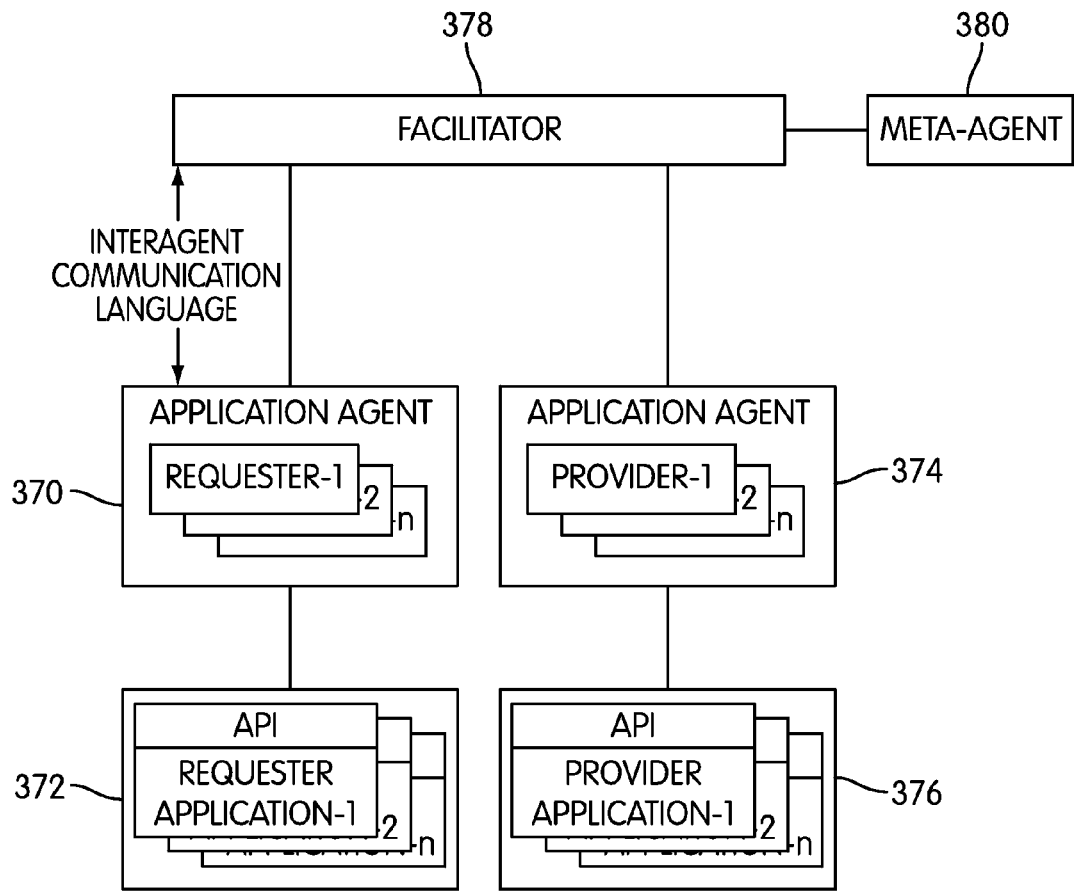
FIG. 7 is a functional diagram of the general mode of operation of an agent-based system.

FIG. 7 is a schematic diagram illustrating the agent concept in more detail. In FIG. 7, requesting agents or requesters 370 control and execute a number of applications 372, each application 372 having an application programming interface (API). The requesters 370 make queries of any one of a number of providing agents or providers 374 as necessary using ICL. The providers 374 control and execute their own respective applications 376 to provide answers to the queries. A facilitating application or facilitator 378 facilitates the communication between the agents 370, 374, and a meta-agent 380 controls the facilitator 378.

In system 300 of FIG. 5, the dialogue manager agent 312 acts as a meta agent. More particularly, it monitors the execution of dialogue strategies and is able to change plans as unplanned events occur. In general, it interweaves high-level tutorial planning with adaptive on-the-fly plans. As shown in FIG. 5, the dialogue manager agent 312 interfaces with agents that handle inference 314 and history-tracking 316 tasks, as well as a knowledge base agent 318 that accesses sources and models. As shown in FIG. 5, the dialogue manager agent 312 may send responses back to the student or user through a speech synthesizer 320, in textual format, via a Web page, or in any other appropriate manner.

Figure 8:
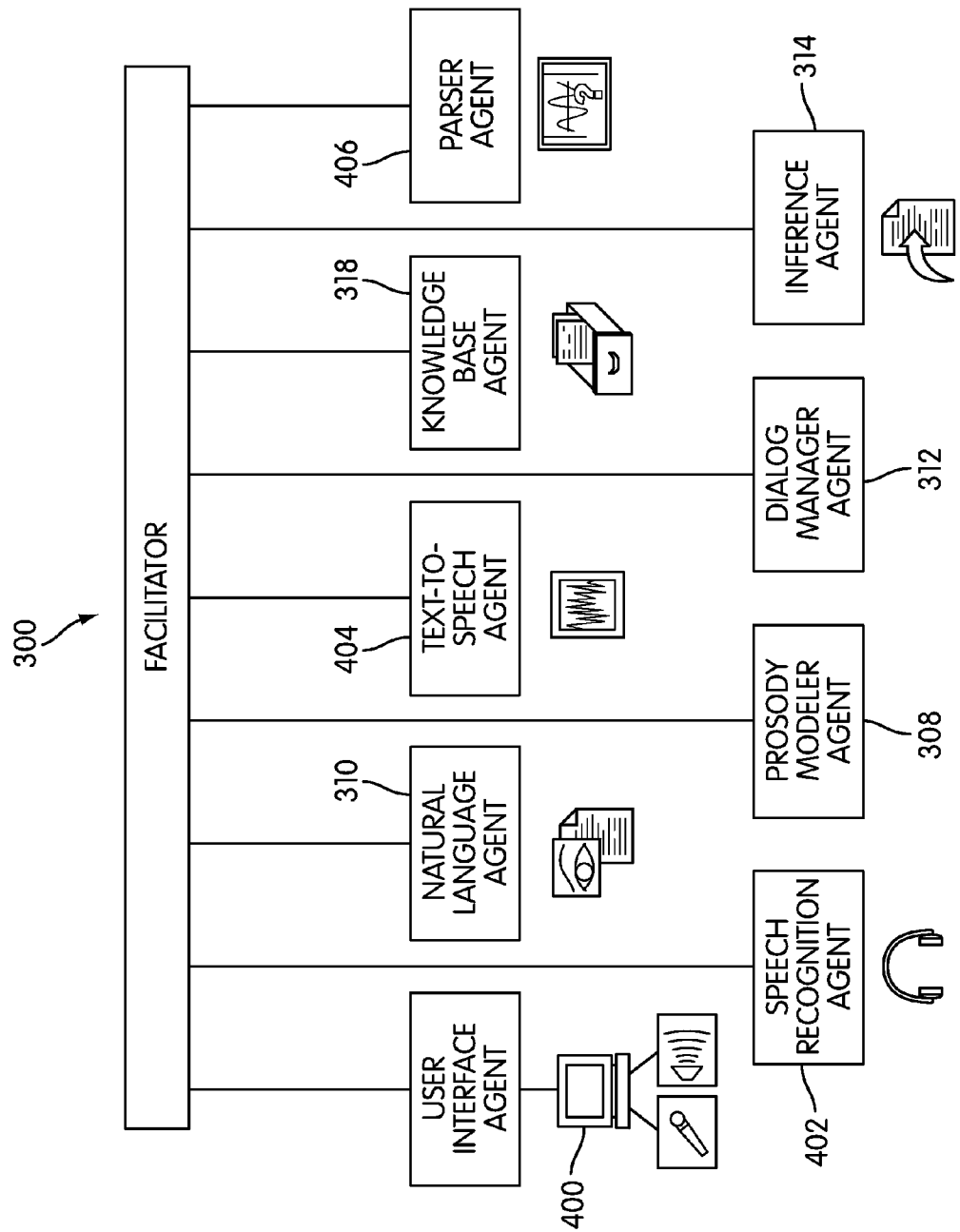
FIG. 8 is an illustration of a number of the agents that may be used to implement the system of FIG. 5.

FIG. 8 is a diagram illustrating some of the other agents that may be implemented in system 300. As shown in FIG. 8, a user interface agent 400 handles the tasks of receiving speech utterances and outputting the responses to those utterances, whether in the form of synthesized speech, text, multimedia, or some other form. To this end, it is helpful if the user interface agent can be interfaced with common multimedia development tools and languages, including Director, Flash, ActiveX, and Java, to name a few.

A speech recognition agent 402 handles the process of recognizing a speech utterance and outputting a stream of recognized text. As was noted briefly above, in one embodiment, the SR engine may be the EduSpeak SR engine, and this engine may be placed in an OAA wrapper to create the speech recognition agent. The key performance enablers of this SR engine are: high speech recognition accuracy, speaker-independent recognition, no required user training, a small, scalable footprint dependent on vocabulary requirements, support for unlimited-size dynamically loadable grammars, and support for statistical language models (SLM). Support for SLMs is useful since SLMs can be exploited to provide the broadest speech recognition dialog coverage. Optionally, if dialogs are written as finite state grammars, the UNIANCE compiler [Bos, J., Compilation of Unification Grammars with Compositional Semantics to Speech Recognition Packages, COLING 2002. Proceedings of the 19th International Conference on Computational Linguistics, 106-112. Taipei, Taiwan] can be used to add a general semantic component to the Grammar Specification Language (GSL) before the grammar is compiled to a finite state machine used for the language mode. In this way, the speech recognition engine can provide an output that is a syntactic or semantic representation of the student's utterance and be directly used with the dialogue manager.

Of the other agents illustrated in FIG. 8, the natural language agent 310 takes the recognized text and outputs a natural language representation of it. That natural language representation of the text may comprise word phrases present in the text, such as noun phrases, adjective phrases, verb phrases, etc. The natural language agent 310 may operate with a grammar different than that of the speech recognition agent.

The prosody modeler agent 308 performs the functions described above. It should be noted that although CART decision trees are described above, prosody modeler agents according to embodiments of the invention may use any of a variety of machine learning algorithms as classifiers to classify acoustic data and map acoustic correlates to the prosodic structure, including boosting (AdaBoost), artificial neural networks (ANN), support vector machines (SVM) and near-est neighbor methods.

As was described briefly above, prosody modelers in embodiments of the invention may be trained using a speech corpus derived from a population of subjects. This speech corpus may be in the form of a database containing a set of files from one of several recognized linguistic repositories, including the Linguistic Data Consortium of the University of Pennsylvania, Oregon Graduate Institute (OGI), and the Berkeley International Computer Science Institute (ICSI). The corpus sourced from the Oregon Graduate Institute is supplied with a phonetic transcription file with each speech file. If the sourced files are not annotated, the files may be manually marked or linguistically annotated in terms of prosodic stress by a pair of linguistically trained individuals using ToBI, as described above.

More particularly, each of two subsets of files may be annotated by a manual transcriber. In addition, a Jack-knifing training and testing procedure may be used. With this procedure, two thirds of the files used as the training set and one third of the files used as the test set are cyclically exchanged so that three different pairs of training and test sets are created for the entire research measurements. The annotations made by each transcriber can then be compared to ascertain the agreement between the two transcribers in annotating the files that are common to each of the two subsets of files. Syllables may be annotated into two categories—STRESS and UNSTRESSED. Although many levels of prosodic stress are claimed to exist by some phonologists, at most three levels of stress can be detected in speech recordings by trained linguists with even moderate reliability—primary stress, absence of stress and weak stress. In embodiments of the invention, two of those levels of stress may be used, in order to ensure reliability.

As shown in FIG. 8, the system may also include a separate text-to-speech agent 404 and a parser agent 406. Additionally, as was described above, the system may also include one or more cognitive agents, which are not illustrated in FIG. 8.

While the embodiments described above are directed specifically to integrating the prosody analyzer with embodiments of a NLQS system of the type noted above, it will be understood that it could be incorporated within a variety of statistical based NLQS systems. Furthermore, the present invention can be used in both shallow and deep-type semantic processing systems of the type noted in the incorporated patents. The microcode and software routines executed to effectuate the inventive methods may be embodied in various forms, including in a permanent magnetic media, a non-volatile ROM, a CD-ROM, or any other suitable machine-readable format. Accordingly, it is intended that all such alterations and modifications be included within the scope and spirit of the invention as defined by the following claims.

What is claimed is:

1. In a method for performing real-time continuous speech recognition distributed across a client device and a server device, and which transfers speech data from an utterance to be recognized using a packet stream of extracted acoustic feature data including at least some cepstral coefficients, the improvement comprising:
   extracting prosodic features at the client device from the utterance to generate extracted prosodic data;
   transferring said extracted prosodic data with said extracted acoustic feature data to the server device;
   recognizing words spoken continuously in said utterance at said server device based on said extracted acoustic feature data; and
   recognizing an emotion state of a speaker of the utterance at said server device based on at least said extracted prosodic data;
   wherein operations associated with recognition of prosodic features as well as words in the utterance are distributed across the client device and server device, such that a first set of prosodic recognition operations take place at the client device, and a second set of prosodic recognition operations take place at the server device to recognize said emotion state; and wherein said prosodic data and acoustic feature data are transmitted using different priorities.

2. The method of claim 1, wherein said operations are distributed across the client device and server device on a case-by-case basis.

3. The method of claim 1 further including a parts-of-speech analyzer for identifying a first set of emotion cues based on evaluating a syntax structure of the utterance.

4. The method of claim 3, further including a real-time classifier for identifying the emotion state based on said first set of emotion cues and a second set of emotion cues derived from said extracted prosodic data.

5. The method of claim 1, wherein said prosodic features include data values which are related to one or more acoustic measures including one of pitch, duration, and energy.

6. The method of claim 1, wherein said emotion state includes at least one of stress and non-stress.

7. The method of claim 1, wherein said emotion state includes at least one of certainty, uncertainty, or doubt.

8. The method of claim 1, further including a step: performing an operation on natural language presented in said speech utterance to determine a meaning of said speech utterance.

9. The method of claim 8, further including a step: forming a database query based on said utterance to retrieve an answer for said query.

10. The method of claim 1, wherein a number of speech recognition operations and prosody recognition operations performed on the utterance can be adjusted automatically based on resource availability.

11. A method for performing real-time emotion detection comprising:

generating representative speech data from a speech utterance;

recognizing words in said utterance;

extracting syntactic cues from said words relating to an emotion state of a speaker of said speech utterance;

extracting prosodic features from the utterance to generate extracted prosodic data, such that a first set of prosodic recognition operations take place at a client device, and a second set of prosodic recognition operations take place at a server device to recognize said emotion state; and classifying inputs based on said prosodic features and a parts-of speech analyzer relating to said speech utterance and processing the same along with said syntactic cues to output an emotion cue data value corresponding to said emotion state;

wherein said prosodic data and representative speech data are transmitted using different priorities.

12. The method of claim 11, wherein the representative speech data comprises data selected from the group consisting of: digitized, compressed speech data; digitized, uncompressed speech data; extracted acoustic feature data; and cepstral coefficients.

13. The method of claim 11, further including a step: performing an operation on natural language presented in said speech utterance to determine a meaning of said speech utterance.

14. The method of claim 13, further including a step: forming a database query based on said utterance to retrieve an answer for said query.

15. The system method of claim 11, wherein a number of speech recognition operations and prosody recognition operations performed on the utterance can be adjusted automatically based on resource availability.

16. A real-time emotion detector system, comprising:

a prosody analyzer adapted to extract selected acoustic features of a continuous speech utterance;

said prosody analyzer being distributed such that a first set of prosody extraction operations take place at a client device, and a second set of prosody extraction operations take place at a server;

a continuous speech recognizer for identifying words presented in said continuous speech utterance;

a parts-of-speech analyzer adapted to process said words and extract syntactic cues relating to an emotion state of a speaker of said speech utterance; and a classifier adapted to receive inputs from said prosody analyzer and said parts-of-speech analyzer and process the same to output an emotion cue data value corresponding to said emotion state;

wherein said prosodic data and acoustic feature data are transmitted using different priorities.

17. The system of claim 16, wherein the classifier is a trained Classification and Regression Tree classifier.

18. The system of claim 16, wherein said classifier is trained with data obtained during an off-line training phase.

19. The system of claim 18, wherein said classifier uses a history file containing data values for emotion cues derived from a sample population of test subjects and using a set of sample utterances common to content associated with the real-time recognition system.

20. The system of claim 16, wherein said emotion cue data value is in the form of a data variable suitable for inclusion within a SQL construct.

21. In a system for performing real-time continuous speech recognition which is distributed across a client device and a server device, and which transfers speech data from an utterance to be recognized using a packet stream of extracted acoustic feature data including at least some cepstral coefficients, the improvement comprising:

a first routine executing on the client device configured to extract prosodic features from the utterance and to generate extracted prosodic data;

a second routine executing on the client device configured to transfer said extracted prosodic data with said extracted acoustic feature data to the server device;

a third routine executing on said server device and adapted to recognize words spoken continuously in said utterance based on said extracted acoustic feature data; and a fourth routine executing on the server device configured to recognize an emotion state of a speaker of the utterance based on at least said extracted prosodic data;

wherein operations associated with recognition of prosodic features and words in the utterance are distributed across the client device and server device, such that a first set of operations take place at the client device, and a second set of operations take place at the server device to recognize said emotion state; and wherein said prosodic data and acoustic feature data are transmitted using different priorities.

22. The system of claim 21, further including a fifth routine executing on the server device configured to extract syntax information from the utterance and generate a set of emotion cues which are used by said fourth routine in combination with said extracted prosodic data to determine said emotion state.

23. The system of claim 21, wherein said emotion state is used to formulate a response by an interactive agent in a real-time natural language processing system.

24. The system of claim 21, wherein said emotion state is used by an interactive agent to control dialog content and/or a dialog sequence with a user of a speech recognition system.

25. The system of claim 21, wherein said emotion state is used to control visual feedback presented to a user of the real-time speech recognition system.

26. The system of claim 21, wherein said emotion state is used to control non-verbal audio feedback presented to a user of the real-time speech recognition system.

27. The system of claim 26, wherein said non-verbal audio feedback is one of a selected set of audio recordings associated with different user emotion states.

28. The system of claim 21, wherein an amount of prosodic data to be transferred to said server device is determined on a case by case basis in accordance with one or more of the following parameters: (a) computational capabilities of the respective devices; (b) communications capability of a network coupling the respective devices; (c) loading of said server device; and (d) a performance requirement of a speech recognition task associated with a user query.

29. The system of claim 21, wherein both prosodic data and acoustic feature data are packaged within a common data stream as received at the server device.

30. The system of claim 21, wherein prosodic data and acoustic feature data are packaged within different data streams as received at the server device.

31. The system of claim 21, wherein said prosodic data is selected and configured to have a data content which is significantly less than said acoustic feature data.

32. The system of claim 21, wherein said prosodic data and acoustic feature data are configured with different payload formats within their respective packets by a transport routine.

33. The system of claim 21, wherein said emotion state is determined by evaluating both individual words and an entire sentence of words uttered by the user.

34. The system of claim 21, further including a calibration routine.

35. A real-time emotion detector system, comprising:
a prosody analyzer adapted to extract selected acoustic features of a continuous speech utterance;
said prosody analyzer being distributed such that a first set of prosody extraction operations take place at a client device, and a second set of prosody extraction operations take place at a server;
a continuous speech recognizer for identifying words presented in said continuous speech utterance;
a parts-of-speech analyzer adapted to process said words and extract syntactic cues relating to an emotion state of a speaker of said speech utterance; and
a classifier adapted to receive inputs from said prosody analyzer and said parts-of-speech analyzer and process the same to output an emotion cue data value corresponding to said emotion state;
wherein said prosodic data and representative speech data are transmitted using different priorities.

36. The system of claim 35, wherein the representative speech data comprises data selected from the group consisting of: digitized, compressed speech data; digitized, uncompressed speech data; extracted acoustic feature data; and cepstral coefficients.

37. The system of claim 35, wherein the classifier is a trained Classification and Regression Tree classifier.

38. The system of claim 35, wherein said classifier is trained with data obtained during an off-line training phase.

39. The system of claim 38, wherein said classifier uses a history file containing data values for emotion cues derived from a sample population of test subjects and using a set of sample utterances common to content associated with the real-time recognition system.

40. The system of claim 35, wherein said emotion cue data value is in the form of a data variable suitable for inclusion within a SQL construct.

\* \* \* \* \*